United States Patent
Fujita et al.

(10) Patent No.: US 10,384,679 B2
(45) Date of Patent: Aug. 20, 2019

(54) TRAVEL CONTROL METHOD AND TRAVEL CONTROL APPARATUS

(71) Applicant: Nissan Motor Co., Ltd., Yokohama-Shi, Kanagawa (JP)

(72) Inventors: Susumu Fujita, Kanagawa (JP); Yohei Mishina, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/763,369

(22) PCT Filed: Sep. 30, 2015

(86) PCT No.: PCT/JP2015/077785
§ 371 (c)(1),
(2) Date: Mar. 26, 2018

(87) PCT Pub. No.: WO2017/056249
PCT Pub. Date: Apr. 6, 2017

(65) Prior Publication Data
US 2018/0273031 A1    Sep. 27, 2018

(51) Int. Cl.
B60W 30/12 (2006.01)
G01C 21/00 (2006.01)
G05D 1/00 (2006.01)
G01C 21/30 (2006.01)
G01C 21/36 (2006.01)
G05D 1/02 (2006.01)

(52) U.S. Cl.
CPC ............ B60W 30/12 (2013.01); G01C 21/30 (2013.01); G01C 21/3602 (2013.01); G01C 21/3667 (2013.01); G05D 1/021 (2013.01); B60W 2550/14 (2013.01); B60W 2720/24 (2013.01)

(58) Field of Classification Search
CPC ............ B60W 30/12; B60W 2720/24; B60W 2550/14; G01C 21/3667; G05D 1/021
See application file for complete search history.

(56) References Cited

U.S. PATENT DOCUMENTS

| | | | |
|---|---|---|---|
| 9,310,804 B1 * | 4/2016 | Ferguson | B60W 40/00 |
| 2006/0220912 A1 * | 10/2006 | Heenan | G05D 1/0248 340/933 |
| 2013/0138264 A1 | 5/2013 | Hoshizaki | |

FOREIGN PATENT DOCUMENTS

| | | |
|---|---|---|
| JP | H11-7534 A | 1/1999 |
| JP | 2008-241276 A | 10/2008 |
| JP | 2010-154304 A | 7/2010 |
| JP | 2010-259021 A | 11/2010 |
| WO | 2006037402 A1 | 4/2006 |

* cited by examiner

Primary Examiner — Yonel Beaulieu
(74) Attorney, Agent, or Firm — Young Basile Hanlon & MacFarlane, P.C.

(57) ABSTRACT

A travel control method includes a detector that detects information on lane boundary lines of a lane around a subject vehicle as real boundary line information from an actual environment around the subject vehicle. The travel control method also includes integrating the real boundary line information and map boundary line information to generate integrated boundary line information. The map boundary line information is information on the lane boundary lines of the lane included in map information. The travel control method further includes outputting the generated integrated boundary line information.

20 Claims, 15 Drawing Sheets

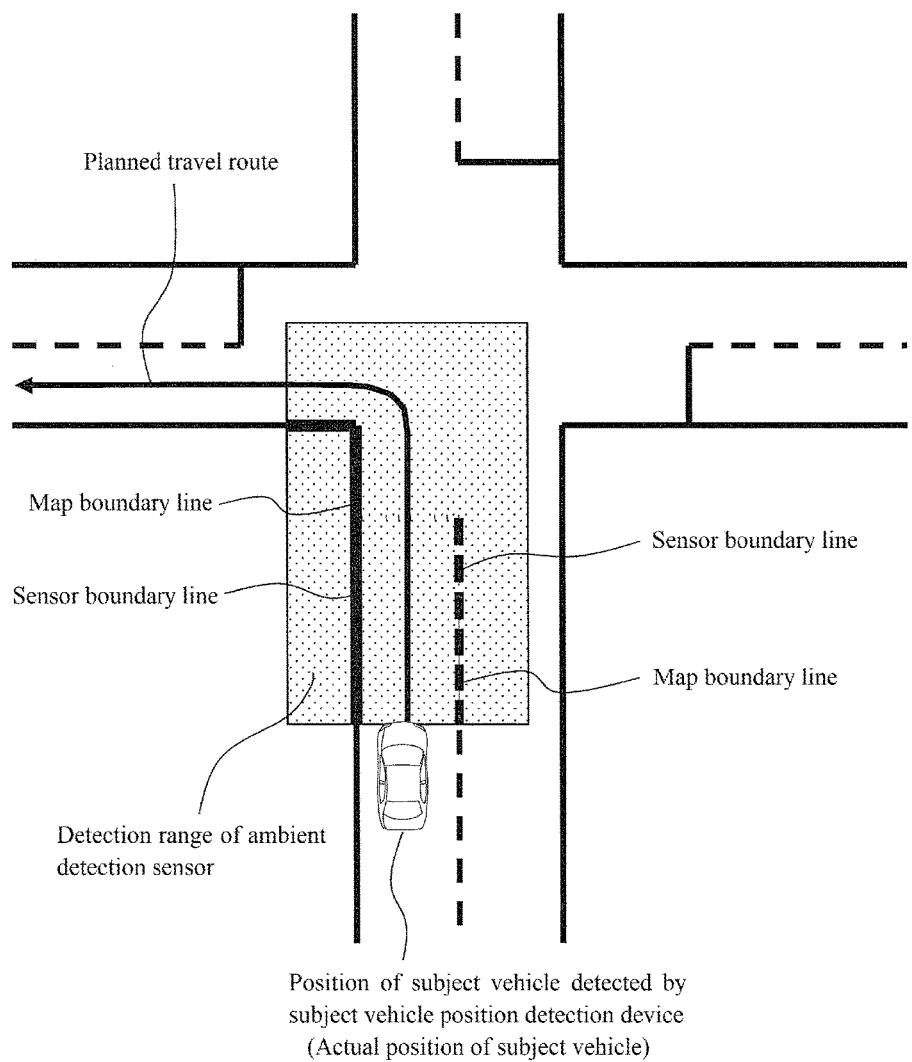

TRAVEL CONTROL METHOD AND TRAVEL CONTROL APPARATUS

TECHNICAL FIELD

The present invention relates to a travel control method and a travel control apparatus for controlling travel of a vehicle.

BACKGROUND

To prevent a subject vehicle from coming close to another vehicle at an intersection, a technique has been conventionally known which includes detecting the position of the subject vehicle, acquiring lane information of a road on which the subject vehicle travels from map information on the basis of the detected position of the subject vehicle, specifying a lane in which the subject vehicle travels and a traveling direction of the subject vehicle, and transmitting the specified information of the lane and the traveling direction to another vehicle (see Japanese Patent Application Publication No. 2010-259021A).

When specifying the lane in which the subject vehicle travels, the position of the subject vehicle has to be detected with a high degree of accuracy. In the conventional technique, however, the sensor for detecting the position of a vehicle with a high degree of accuracy is expensive, which may cause an increased cost for producing vehicles.

A problem to be solved by the present invention is to provide a travel control method that allows information on lane boundary lines to be appropriately output.

SUMMARY

The present invention solves the above problem through detecting information on a lane boundary line of a lane around a subject vehicle as real boundary line information from an actual environment around the subject vehicle, integrating the real boundary line information and map boundary line information to generate integrated boundary line information, and outputting the generated integrated boundary line information. The map boundary line information is information on the lane boundary line of the lane included in map information.

According to the present invention, information on lane boundary lines can be appropriately output.

BRIEF DESCRIPTION OF THE DRAWINGS

FIG. 2 is a view for describing the detection range of an ambient detection sensor;

DETAILED DESCRIPTION OF THE EMBODIMENTS

Hereinafter, one or more embodiments of the present invention will be described with reference to the drawings. In the embodiments, a travel control apparatus equipped in a vehicle will be exemplified and described.

The travel control apparatus according to one or more embodiments of the present invention operates to detect lane boundary lines, such as lane marks, curbstones and guardrails, which actually exist around a vehicle (subject vehicle) utilizing one or more sensors equipped in the subject vehicle and detect information on the lane boundary lines of a planned travel route of the subject vehicle from map information. Then, the travel control apparatus operates to integrate the lane boundary lines detected by the sensors and the lane boundary lines of the map information and output information on the integrated lane boundary lines.

First Embodiment

Figure 1:
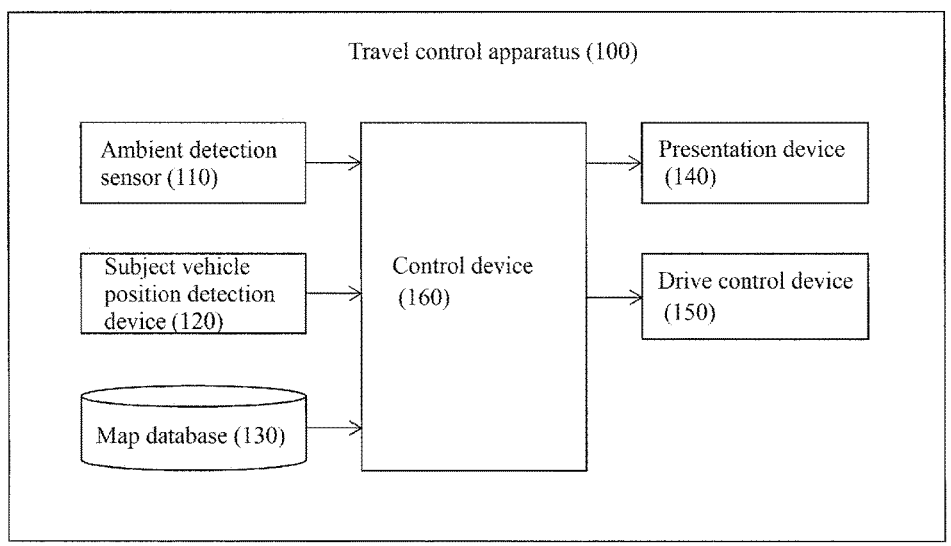
FIG. 1 is a block diagram illustrating the configuration of a travel control apparatus according to one or more embodiments of the present invention.

FIG. 1 is a block diagram illustrating the configuration of a travel control apparatus 100 according to the present embodiment. As illustrated in FIG. 1, the travel control apparatus 100 according to the present embodiment includes an ambient detection sensor 110, a subject vehicle position detection device 120, a map database 130, a presentation device 140, a drive control device 150, and a control device 160. These devices are connected to one another via a controller area network (CAN) or other in-vehicle LAN for mutually exchanging information.

The ambient detection sensor 110 detects obstacles (such as other vehicles) and road markers (such as lane marks and curbstones) existing around the subject vehicle. Examples of the ambient detection sensor 110 include a front camera that captures images ahead of the subject vehicle, a rear camera that captures images behind the subject vehicle, and side cameras that capture images at sides of the subject vehicle. A laser range finder (LRF) that detects obstacles around the subject vehicle can also be used as the ambient detection sensor 110. The ambient detection sensor 110 may be configured using one sensor of the above-described sensors or may also be configured using a combination of two or more sensors. The detection results by the ambient detection sensor 110 are output to the control device 160.

The subject vehicle position detection device 120 is composed of a GPS unit, a gyro-sensor, a vehicle speed sensor, and other necessary components. The subject vehicle position detection device 120 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 120 is output to the control device 160.

The map database 130 stores map information that includes road information. The road information includes information on lane boundary lines that define lanes of roads, information on intersections, stop lines and pedestrian crosswalks, information on road shapes (such as information as to whether the road is a curve), and information on the curvature of roads. The map database 130 stores these road information items such that they are associated with respective positions on a map. This allows the travel control apparatus 100 to refer to the map database 130 thereby to acquire the information on lane boundary lines, intersections, stop lines, pedestrian crosswalks, road shapes, and road curvature at respective positions on the planned travel route of the subject vehicle. The information on lane boundary lines includes information as to whether the lane boundary lines are lane marks or curbstones and, in the case of lane marks, further includes information on color (such as white and yellow) and types (such as double lines, solid lines, and dotted lines) of the lane boundary lines.

The presentation device 140 may be, for example, a device such as a display of a navigation device, a display incorporated in a rearview mirror, a display incorporated in a meter unit, a head-up display projected on a windshield, and a speaker of an audio device.

The drive control device 150 controls travel of the subject vehicle. For example, when the subject vehicle follows a preceding vehicle, the drive control device 150 controls the operation of a drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed so that the distance between the subject vehicle and the preceding vehicle can be maintained at a constant distance. When the subject vehicle changes lanes or turns right or left at an intersection, the drive control device 150 controls the operation of a steering actuator to control the operation of wheels and thereby executes the control of direction change of the subject vehicle. Other well-known methods can also be used as a travel control method by the drive control device 150.

In addition or alternatively, the drive control device 150 controls travel of the subject vehicle on the basis of information on the lane boundary lines output from the control device 160, which will be described below. For example, the drive control device 150 perceives the lane of a planned travel route of the subject vehicle on the basis of the information on the lane boundary lines output from the control device 160 and can thereby control travel of the subject vehicle so that the subject vehicle travels in the lane of the planned travel route. In addition or alternatively, the drive control device 150 perceives the position on the map at which the subject vehicle travels (such as a right-turn lane, an intersection, and a position before a pedestrian crosswalk) on the basis of the information on the lane boundary lines output from the control device 160 and can thereby appropriately determine the action of the subject vehicle (such as stopping, accelerating, turning right, and turning left).

The control device 160 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

The control device 160 executes the programs stored in the ROM using the CPU thereby to achieve the following various functions: a route search function of searching for a planned travel route of the subject vehicle; a map boundary line detection function of detecting boundary lines of lanes on the basis of the map information; a sensor boundary line detection function of detecting boundary lines of lanes on the basis of the detection results by the ambient detection sensor 110; a boundary line integration function of integrating the lane boundary lines detected based on the map information and the lane boundary lines detected based on the detection results by the ambient detection sensor 110; and an output function of outputting information on the integrated lane boundary lines. Each function of the control device 190 will be described below.

The control device 160 uses the route search function to generate a planned travel route of the subject vehicle from the current position and destination of the subject vehicle. For example, the route search function can serve to acquire the position of the subject vehicle from the subject vehicle position detection device 120 and acquire the destination, which the driver input, from an input device (not illustrated). The route search function can also serve to search for the planned travel route using a method known in the art.

The control device 160 uses the map boundary line detection function to detect lane boundary lines of lanes including the subject vehicle lane on the basis of the map information stored in the map database 130. The lane boundary lines refer to lines that define boundaries between lanes and adjacent lanes or boundaries between lanes and road shoulders, such as lane marks (solid lines, double lines, broken lines and other lines drawn with white, orange, yellow or the like on a road to define lanes), curbstones, and guardrails. The map information stored in the map database 130 includes information on the boundary lines of each lane, and the map boundary line detection function can serve to refer to the map information to detect the lane boundary lines of lanes including the subject vehicle lane from the map information. The lane boundary lines detected using the map boundary line detection function are not limited to the lanes around the subject vehicle, and the map boundary line detection function can also serve to detect lane boundary lines of lanes, for example, on the planned travel route of the subject vehicle. In the following description, the lane boundary lines detected using the map boundary line detection function will be referred to as "map boundary lines."

The control device 160 uses the sensor boundary line detection function to detect lane boundary lines of lanes around the subject vehicle on the basis of the detection results by the ambient detection sensor 110. For example, the sensor boundary line detection function can serve to detect the lane boundary lines of lanes around the subject vehicle through capturing images of lane marks, curbstones and guardrails existing around the subject vehicle using the front camera, side cameras or rear camera and analyzing the captured images. In addition or alternatively, the sensor boundary line detection function can serve to detect the lane boundary lines of lanes around the subject vehicle through detecting the brightness of the road surface and lane marks around the subject vehicle using a laser range finder or detecting protrusions of curbstones by distance measurement.

On general roads that include many curves and intersections, it is difficult to estimate the directions in which lane marks and curbstones exist, and the resolution of the cameras is limited. The range in which the cameras can detect the lane marks, curbstones, guardrails, etc. with a high degree of accuracy is therefore a range of about several tens of meters from the cameras. A laser range finder can also be used to identify the lane marks and curbstones. In this case, however, the laser range finder has to be installed downward in order to detect the brightness of the lane marks drawn on the road surface and detect small protrusions of curbstones. Accordingly, also in the case of using a laser range finder, the range in which the laser range finder can detect the lane marks and curbstones with a high degree of accuracy is a range of about several tens of meters from the laser range finder. Thus, as illustrated in FIG. 2, the range in which the sensor boundary line detection function can serve to detect the lane boundary lines is a range of about several tens of meters from the subject vehicle. FIG. 2 is a view for describing the detection range of the ambient detection sensor 110. In the following description, the lane boundary lines detected using the sensor boundary line detection function will be referred to as "sensor boundary lines."

Figure 3A:
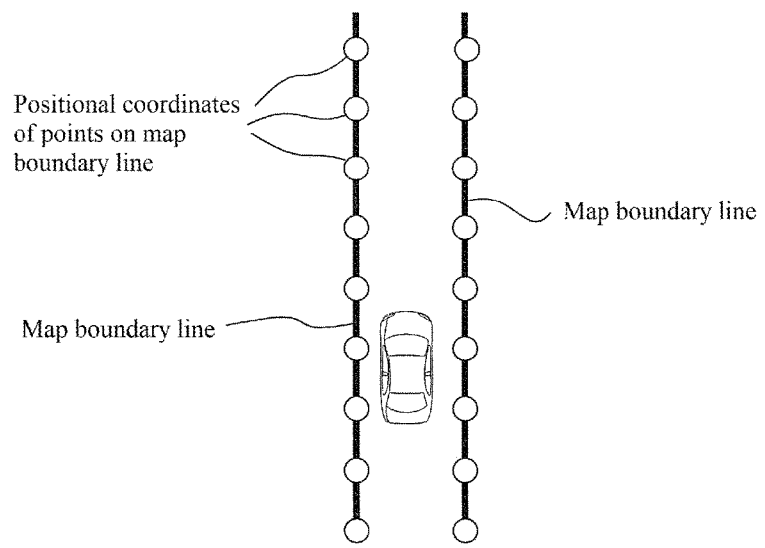
FIG. 3(A) is a view for describing clouds of points on map boundary lines and FIG. 3(B) is a view for describing clouds of points on sensor boundary lines.

As illustrated in FIG. 3(A), when the map information is stored such that the map boundary lines are each represented by a cloud of points composed of positional coordinates of points on each map boundary line, the map boundary line detection function can serve to detect each of the map boundary lines as a map boundary line represented by the cloud of points. More specifically, the map boundary line detection function can serve to detect each of the right and left map boundary lines with respect to the traveling direction of the subject vehicle as a map boundary line represented by the cloud of points. On the other hand, when the map information is stored such that the map boundary lines are each expressed by a function having a specific order, the map boundary line detection function can serve to detect each of the map boundary lines as a map boundary line expressed by the function.

Figure 3B:
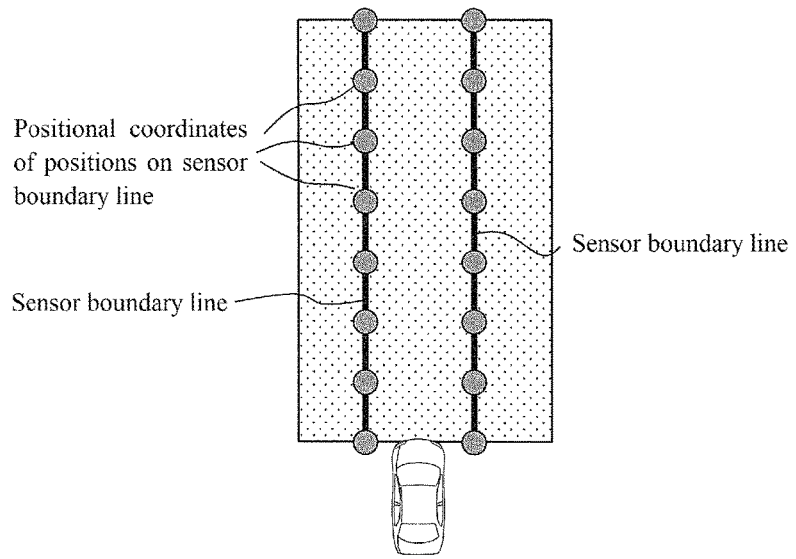

Likewise, as illustrated in FIG. 3(B), the sensor boundary line detection function can serve to detect each of the sensor boundary lines as a sensor boundary line represented by a cloud of points. More specifically, the sensor boundary line detection function can serve to detect each of the right and left sensor boundary lines with respect to the traveling direction of the subject vehicle as a sensor boundary line represented by the cloud of points. In addition or alternatively, the sensor boundary line detection function can serve to detect each of the sensor boundary lines as a function having a specific order. For example, when the sensor boundary lines detected by the ambient detection sensor 110 are each represented by a cloud of points, the sensor boundary line detection function can serve to fit each of the sensor boundary lines with a function having a specific order thereby to detect the function fitted with each of the sensor boundary lines as a sensor boundary line expressed by the function. FIG. 3(A) is a view for describing the map boundary lines represented by the clouds of points and FIG. 3(B) is a view for describing the sensor boundary lines represented by the clouds of points.

The control device 160 uses the boundary line integration function to integrate the map boundary lines detected using the map boundary line detection function and the sensor boundary lines detected using the sensor boundary line detection function to generate lane boundary lines of lanes including the lane in which the subject vehicle travels. Here, as illustrated in FIG. 2, the range in which the sensor boundary line detection function can serve to detect the lane boundary lines (sensor boundary lines) with a high degree of accuracy is a range around the subject vehicle, and as the distance from the subject vehicle increases, the accuracy of detecting the lane boundary lines (sensor boundary lines) lowers. In the present embodiment, therefore, a region outside the detection range in which the sensor boundary line detection function can serve to detect the lane boundary lines is complemented using the lane boundary lines (map boundary lines) detected using the map boundary line detection function.

For example, FIG. 2 illustrates a state in which the detection range of the ambient detection sensor 110 is superimposed on the position of the subject vehicle detected by the subject vehicle position detection device 120 and the range outside the sensor boundary lines based on the detection results by the ambient detection sensor 110 is complemented with the map boundary lines based on the map information. When the error of the position of the subject vehicle detected by the subject vehicle position detection device 120 is small, the map boundary lines based on the map information coincide with the sensor boundary lines based on the detection results by the ambient detection sensor 110, as illustrated in FIG. 2, and large shifts do not occur.

Figure 4:
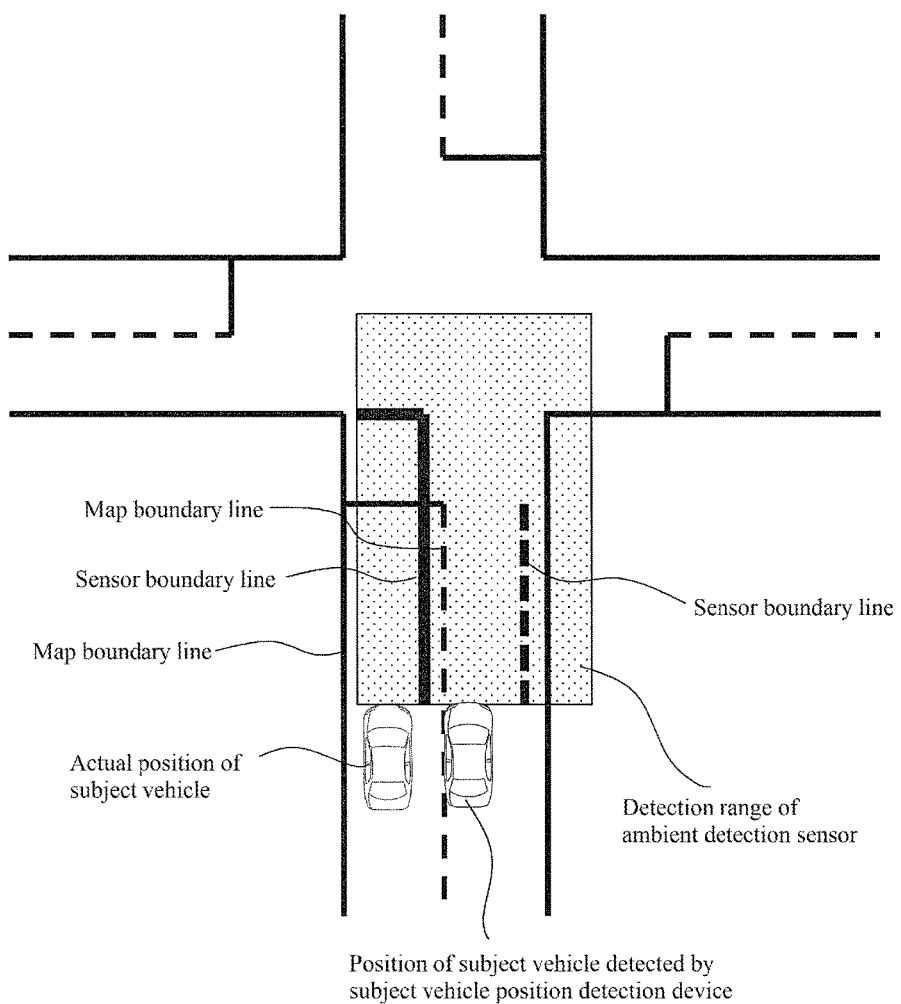
FIG. 4 is a view for describing shifts between the map boundary lines and the sensor boundary lines when errors occur in the detection results by a subject vehicle position detection device.

However, unfortunately, the detection error of the position of the subject vehicle due to the subject vehicle position detection device 120 may cause an error, as illustrated in FIG. 4, between the actual position of the subject vehicle (indicated by broken lines in the figure) and the position of the subject vehicle (indicated by solid lines in the figure) based on the detection result by the subject vehicle position detection device 120. In this case, as illustrated in FIG. 4, large shifts occur between the map boundary lines based on the map information and the sensor boundary lines based on the detection results by the ambient detection sensor 110. As illustrated in FIG. 4, therefore, lane boundary lines adapted to the actual lane boundary lines may not be generated merely by integrating the outside of the range, in which the sensor boundary line detection function can serve to detect the sensor boundary lines, with the map boundary lines detected using the map boundary line detection function.

The boundary line integration function therefore serves to complement the sensor boundary lines detected by the ambient detection sensor 110 with the map boundary lines based on the map information so that, as illustrated in FIG. 2, the sensor boundary lines detected by the ambient detection sensor 110 coincide with the map boundary lines based on the map information. For example, the boundary line integration function serves first to determine a degree of coincidence between a sensor boundary line detected by the ambient detection sensor 110 and a map boundary line based on the map information using an iterative closest point (ICP) scheme. The ICP refers to an algorism employed to align a "cloud of points representing a sensor boundary line detected by the ambient detection sensor 110" and a "cloud of points representing a map boundary line possessed by the map information" on the basis of the least-square method.

Figure 5:
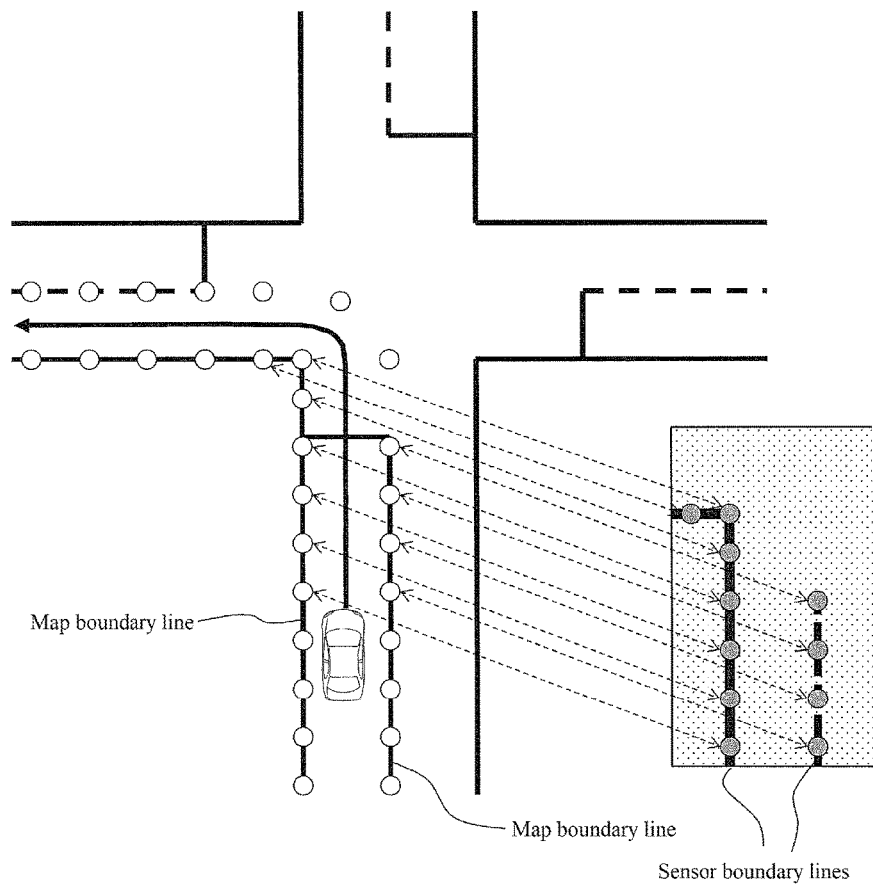
FIG. 5 is a view for describing an example of a method of integrating lane boundary lines.

FIG. 5 is a view illustrating an example of a method of integrating the lane boundary lines using the boundary line integration function. In FIG. 5, white circles form clouds of points representing the map boundary lines while gray circles form clouds of points representing the sensor boundary lines. For example, when an intersection exists ahead of the subject vehicle as illustrated in FIG. 5, the boundary line integration function can serve to take into account a portion in which the curbstones near the intersection are arranged at an approximately right angle, to align the "clouds of points representing the sensor boundary lines" with the "clouds of points representing the map sensor boundary lines." Thus, the boundary line integration function can serve to align the "clouds of points representing the sensor boundary lines" with the "clouds of points representing the map sensor boundary lines" on the basis of a characterizing portion of the road (the approximately right-angled portion in the example illustrated in FIG. 5) thereby to detect portions of the map boundary lines having a high degree of coincidence with the sensor boundary lines. More practically, even when the subject vehicle is detected at a position different from the actual position due to the detection error of the subject vehicle position detection device 120 as illustrated in FIG. 4, such alignment allows an appropriate position of the subject vehicle to be obtained on the map, and the lane boundary lines of lanes around the subject vehicle can be appropriately perceived.

As described above, the map boundary lines and the sensor boundary lines may each be represented by a cloud of points or expressed by a function, as illustrated in FIGS. 3(A) and 3(B). In the above-described ICP, a map boundary line and a sensor boundary line each represented by a cloud of points can be cross-checked, but a map boundary line and a sensor boundary line each expressed by a function may not be cross-checked with each other. When a map boundary line or a sensor boundary line is detected as a function, therefore, the map boundary line or sensor boundary line expressed by the function may have to be converted to a map boundary line or a sensor boundary line represented by a cloud of points. In this case, conversion may have to be performed such that information on the map boundary line or sensor boundary line expressed by the function and information on the map boundary line or sensor boundary line represented by the cloud of points fall within a certain error range. The boundary line integration function therefore serves to reduce the interval of the positional coordinates of points on the map boundary line or sensor boundary line represented by the cloud of points as the curvature of the road increases, and increase the interval of the positional coordinates of points on the map boundary line or sensor boundary line represented by the cloud of points as the curvature of the road decreases.

In the present embodiment, the boundary line integration function serves to cross-check the sensor boundary lines and the map boundary lines with reference to the position of the subject vehicle or the planned travel route of the subject vehicle. For example, the boundary line integration function serves to cross-check a sensor boundary line and a portion of a map boundary line in the vicinity of the position of the subject vehicle detected by the position detection device 120, and when they do not coincide with each other, the boundary line integration function serves to cross-check the sensor boundary line and another portion of the map boundary line located at a position far from the position of the subject vehicle. In addition or alternatively, the boundary line integration function serves to cross-check a map boundary line and a sensor boundary line along the planned travel route of the subject vehicle. This allows the map boundary lines and the sensor boundary lines to be efficiently cross-checked.

Figure 6:
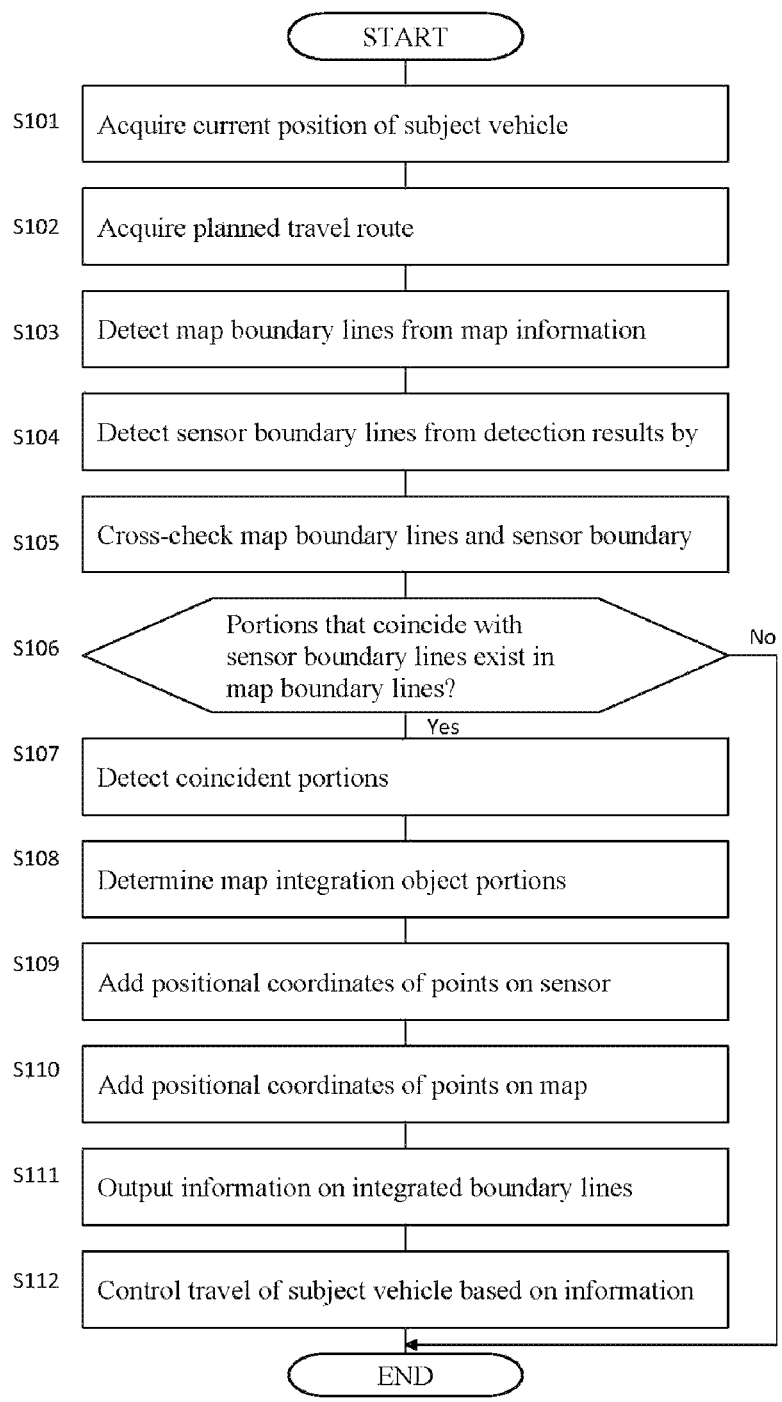
FIG. 6 is a flowchart illustrating a travel control process according to a first embodiment.

A travel control process according to the first embodiment will now be described with reference to FIG. 6. FIG. 6 is a flowchart illustrating the travel control process according to the first embodiment.

In step S101, the control device 160 uses the route search function to detect the current position of the subject vehicle. In step S102, the control device 160 uses the route search function to search for a planned travel route. For example, the route search function serves to search for a planned travel route from the current position of the subject vehicle to the destination on the basis of the positional information of the subject vehicle acquired in step S101. The route search function may search for a planned travel route not only on the basis of the road on which the subject vehicle travels but also on the basis of the lane in which the subject vehicle travels. For example, the route search function can serve to determine the planned travel route of the subject vehicle at a lane level by a scheme using a graph search algorithm, such as Dijkstra's algorithm and A* search algorithm. In the present embodiment, the map database 130 stores the map information which includes, for example, information on links and nodes of each lane. The links are preliminarily weighted in accordance with the travel distance, road situation, etc. of each lane (for example, the weighting of links increases as the distance increases or the road situation deteriorates). The route search function further serves to specify a lane that is suitable for the travel route to the destination and correct the weighting of links of the specified lane. For example, when right turn is required to arrive at the destination, the weighting of links of the lane for right turn can be corrected to decrease. The route search function can serve to search for a planned travel route that is a route at a lane level in which the total sum of weighting of links is minimum in the lane from the current position of the subject vehicle to the destination, using a graph search algorithm such as Dijkstra's algorithm and A* search algorithm.

Figure 7:
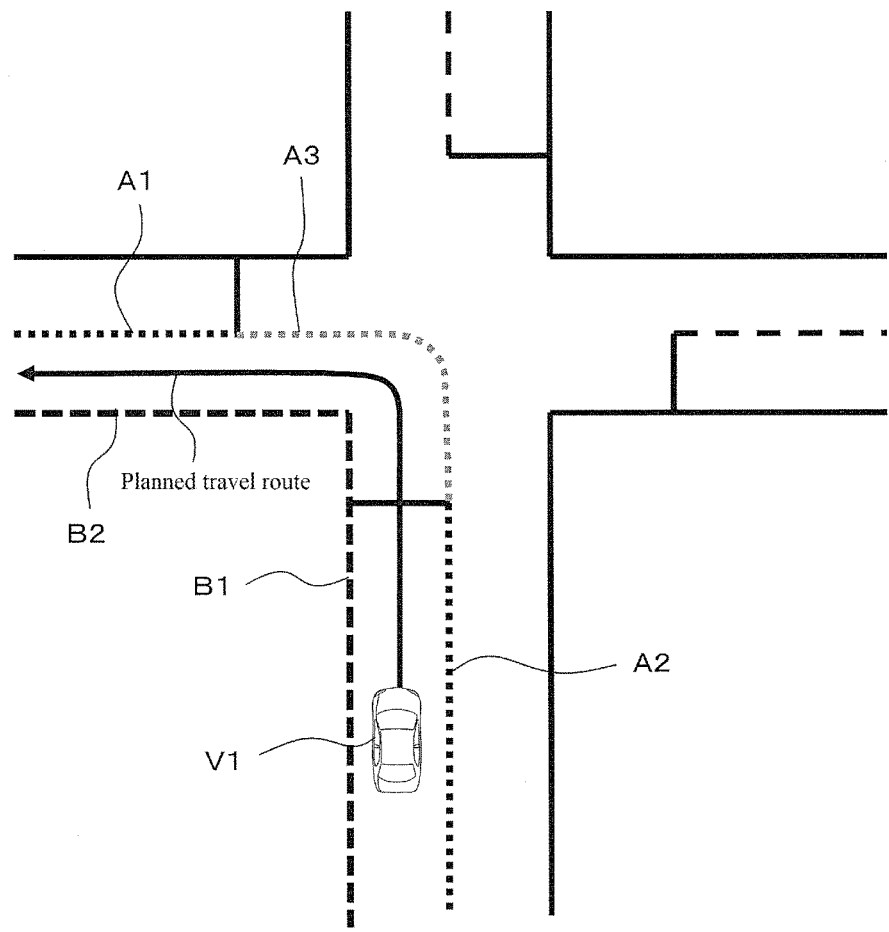
FIG. 7 is a view illustrating an example of the map boundary lines.

In step S103, the control device 160 uses the map boundary line detection function to detect map boundary lines. In the present embodiment, the map database 130 stores information on the lane boundary lines of each lane such that the information is associated with positions on the map. In the example illustrated in FIG. 7, for example, the map boundary line detection function can serve to acquire the lane boundary line information of a lane on the planned travel route of the subject vehicle and perceive that curbstones B1 exist at the left side of the traveling direction. Then, the map boundary line detection function can serve to detect the curbstones B1 at the left side of the traveling direction as a map boundary line at the left side of the traveling direction. The map boundary line detection function can also serve to perceive that a white line A2 exists at the right side of the traveling direction and detect the white line A2 at the right side of the traveling direction as a map boundary line at the right side of the traveling direction. Likewise, in the example illustrated in FIG. 7, the map boundary line detection function can serve to detect curbstones B2 and a white line A1 as the map boundary lines located ahead of the subject vehicle on the planned travel route. FIG. 7 is a view illustrating an example of the map boundary lines.

In an actual intersection, no partition line exists in the intersection. As illustrated in FIG. 7, however, the map information is stored with a virtual lane boundary line even in the intersection. In the case of FIG. 7, therefore, the map boundary line detection function can serve to detect a map boundary line A3 at the right side of the traveling direction even in the intersection in which the subject vehicle turns left.

In step S104, the control device 160 uses the sensor boundary line detection function to perform detection of sensor boundary lines on the basis of the detection results by the ambient detection sensor 110. As illustrated in FIG. 2, the range in which the ambient detection sensor 110 can detect the sensor boundary lines is a range of a certain distance (e.g. several tens of meters) from the subject vehicle, that is, a range around the subject vehicle.

In step S105, the control device 160 uses the boundary line integration function to cross-check the map boundary lines detected in step S103 and the sensor boundary lines detected in step S104. Step S105 is followed by step S106 in which the boundary line integration function serves to determine whether or not portions that coincide with the sensor boundary lines exist in the map boundary lines, on the basis of the cross-check result of step S105. When portions that coincide with the sensor boundary lines exist in the map boundary lines, the routine proceeds to step S107. When portions that coincide with the sensor boundary lines do not exist in the map boundary lines, the travel control process illustrated in FIG. 6 is ended. In the example illustrated in FIG. 5, for example, portions that coincide with the sensor boundary lines exist in the map boundary lines, so the routine proceeds to step S107. The case of "coincidence (and its derivatives)" is not limited to a case in which portions exactly identical with the sensor boundary lines exist in the map boundary lines and also includes a case in which portions having a degree of coincidence of a predetermined value or more with the sensor boundary lines exist in the map boundary lines. The predetermined value can be appropriately set by designing or the like.

In step S107 and subsequent steps, the process is performed using the map boundary lines and sensor boundary lines each represented by a cloud of points. A map boundary line represented by a cloud of points and a sensor boundary line represented by a cloud of points refer to those, as illustrated in FIG. 5, in which the map boundary line and the sensor boundary line are represented by positional coordinates of points on the map boundary line and the sensor boundary line. On the other hand, depending on the designing of the ambient detection sensor 110, control device 160, and map information, the map boundary lines and the sensor boundary lines may each be detected as a boundary line represented by a cloud of points in steps S103 and S104 or may also be each detected as a function having a specific order.

When the map boundary lines and sensor boundary lines each represented by a cloud of points are detected in steps S103 and S104, therefore, the processes of step S107 and subsequent steps are performed using the map boundary lines and sensor boundary lines each represented by a cloud of points without any change. On the other hand, when the map boundary lines and sensor boundary lines each expressed by a function are detected in steps S103 and S104, the map boundary lines and sensor boundary lines each expressed by a function are converted to map boundary lines and sensor boundary lines each represented by a cloud of points, and the processes of step S107 and subsequent steps are performed.

When the map boundary lines and sensor boundary lines each expressed by a function are converted to map boundary lines and sensor boundary lines each represented by a cloud of points, intervals for detecting positional coordinates of points on the map boundary lines and sensor boundary lines each expressed by a function can be appropriately changed so that errors are not more than a predetermined value between the map boundary lines and sensor boundary lines each expressed by a function and the map boundary lines and sensor boundary lines each represented by a cloud of points. In an exemplary configuration, when the road shape is approximately a straight line, the positional coordinates of points on the map boundary lines and sensor boundary lines may be detected with identical intervals, while when the road shape is not a straight line, intervals of the positional coordinates of points on the map boundary lines and sensor boundary lines may be reduced as the curvature of the road increases. In this configuration, when the road shape is approximately a straight line, the positional coordinates of points on the map boundary lines and sensor boundary lines are detected with identical intervals, and information on the map boundary lines and the sensor boundary lines can thereby be simplified. Moreover, when the road shape is a curve, intervals of the positional coordinates of points on the map boundary lines and sensor boundary lines are reduced as the curvature of the road increases, and the map boundary lines and the sensor boundary lines can thereby be detected with a high degree of accuracy. In an additional or alternative configuration, when the speed limit of the road or the speed of the subject vehicle is not lower than a predetermined speed, intervals of the positional coordinates of points on the map boundary lines and sensor boundary lines may be increased as compared with a case in which the speed limit of the road or the speed of the subject vehicle is lower than the predetermined speed. Also in this case, the map boundary lines and the sensor boundary lines can be detected with a high degree of accuracy in accordance with the traveling state of the subject vehicle.

Figure 8:
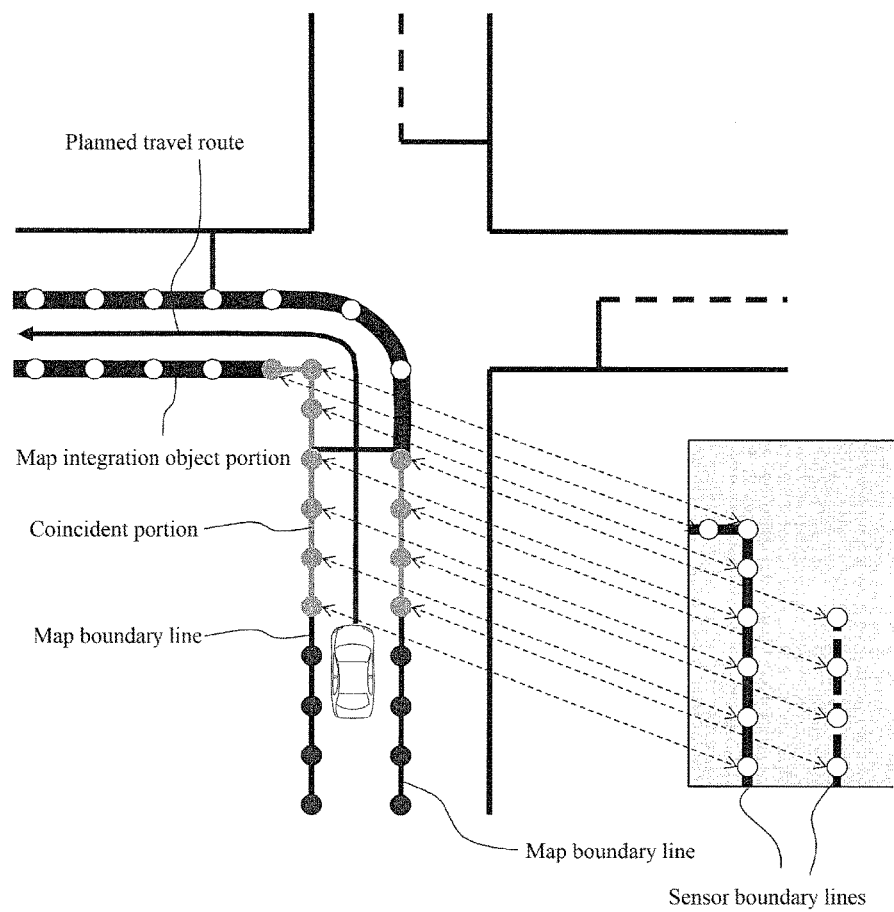
FIG. 8 is a view illustrating an example of coincident portions and map integration object portions.

In step S107, as illustrated in FIG. 8, the boundary line integration function serves to detect portions of the map boundary lines that are coincide with the sensor boundary lines (these portions will also be referred to as "coincident portions," hereinafter). For example, the boundary line integration function can serve to cross-check the map boundary lines and the sensor boundary lines in a certain range with reference to the position of the subject vehicle or the planned travel route of the subject vehicle on the map and detect portions of the map boundary lines that have the highest degree of coincidence with the sensor boundary lines, as the coincident portions. In an alternative configuration, the boundary line integration function may detect portions of the map boundary lines of which the degree of coincidence with the sensor boundary lines is not less than a predetermined value and which are detected first, as the coincident portions.

In step S108, as illustrated in FIG. 8, the boundary line integration function serves to determine map integration object portions. The map integration object portions are located at the traveling direction side of the subject vehicle as compared with the current position of the subject vehicle and are continuous from the coincident portions extracted in step S107. FIG. 8 is a view illustrating an example of the coincident portions and the map integration object portions. In the example illustrated in FIG. 8, the coincident portions of the map boundary lines are indicated by gray solid lines and gray circles (clouds of points) while the map integration object portions of the map boundary lines are indicated by black solid lines (thick lines) and white circles (cloud of points), and the remaining portions of the map boundary lines are indicated by black solid lines (thin lines) and black circles (cloud of points).

In addition, in step S108, the boundary line integration function serves to detect target points S1 and S2 of the determined map integration object portions. The target points S1 and S2 are closest to the subject vehicle. Then the boundary line integration function serves to store the positional coordinates of the target points S1 and S2 in the RAM of the control device 160. In the example illustrated in FIG. 9, for example, the boundary line integration function serves to detect the target points S1 and S2 closest to the subject vehicle and store the positional coordinates (x1Lm, y1Lm) and (x1Rm, y1Rm) of the target points S1 and S2.

Figure 9:
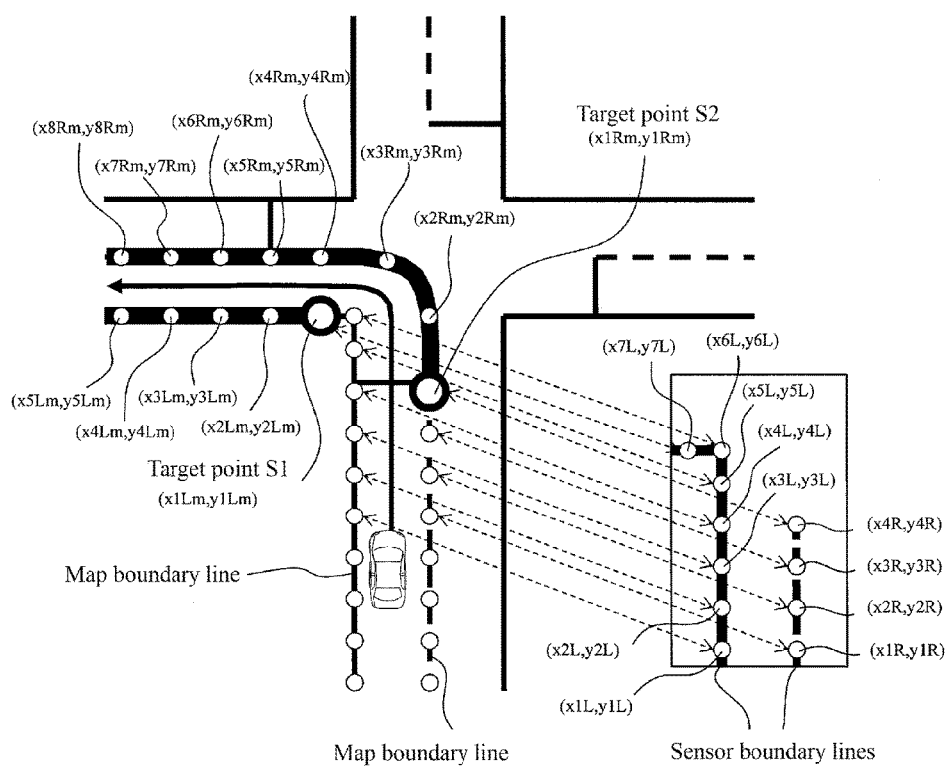
FIG. 9 is a view for describing details of a method of integrating lane boundary lines.

In step S109, the boundary line integration function serves to perform a process of adding the positional coordinates of points on the sensor boundary lines detected in step S104 to an array. For example, in the present embodiment, the RAM of the control device 160 preliminarily stores an empty array (R_bound [ ], L_bound [ ]) that corresponds to the lane boundary line at the right side of the traveling direction and the lane boundary line at the left side of the traveling direction. As illustrated in FIG. 9 and described in the following equations 1 and 2, the boundary line integration function serves to sequentially add the positional coordinates of points on the sensor boundary line at the right side of the traveling direction and the positional coordinates of points on the sensor boundary line at the left side of the traveling direction to respective columns of the array in the order from the point close to the subject vehicle. In the example illustrated in FIG. 9, for example, positional coordinates of seven points (x1L, y1L) to (x7L, y7L) are added to the column of array for the left side of the traveling direction in the order from the positional coordinate close to the subject vehicle. In addition, positional coordinates of four points (x1R, y1R) to (x4R, y4R) are added to the column of array for the right side of the traveling direction in the order from the positional coordinate close to the subject vehicle.

$$R\_bound\ [i]=\{(x1R,y1R),(x2R,y2R),\ldots,(xMR,yMR)\} \quad (1)$$

$$L\_bound\ [i]=\{(x1L,y1L),(x2L,y2L),\ldots,(xNL,yNL)\} \quad (2)$$

In the above equation (1), M is the number of positional coordinates of points on the sensor boundary line, which is represented by a cloud of points, at the right side of the traveling direction, and M is four in the example illustrated in FIG. 9 (the same applies to the following equation (3)). In the above equation (2), N is the number of positional coordinates of points on the sensor boundary line, which is represented by a cloud of points, at the left side of the traveling direction, and N is seven in the example illustrated in FIG. 9 (the same applies to the following equation (4)).

In step S110, the boundary line integration function serves to further add the positional coordinates of points on the map integration object portions determined in step S108 to the array to which the positional coordinates of points on the sensor boundary lines are added in step S109. Specifically, the boundary line integration function serves to add the positional coordinates of points on the map integration object portions determined in step S108 to the array (R_bound [i], L_bound [i]) to which the positional coordinates of points on the sensor boundary lines are added in step S109, in the order from the point close to the subject vehicle.

Through this operation, as described in the following equations (3) and (4), the array (R_bound [i], L_bound [i]) is obtained in which the positional coordinates of points on the map integration object portions are added in the order of proximity to the subject vehicle to follow the positional coordinates of points on the sensor boundary lines which are also added in the order of proximity to the subject vehicle.

$$R\_bound\ [i]=\{(x1R,y1R),(x2R,y2R),\ldots,(xMR,yMR),\\(x1Rm,y1Rm),(x2Rm,y2Rm),\ldots,(xORm,yORm)\} \quad (3)$$

$$L\_bound\ [i]=\{(x1L,y1L),(x2L,y2L),\ldots,(xNL,yNL),\\(x1Lm,y1Lm),(x2Lm,y2Lm),\ldots,(xPLm,yPLm)\} \quad (4)$$

In the above equation (3), O is the number of positional coordinates of points on the map integration object portion, which is represented by a cloud of points, at the right side of the traveling direction, and O is eight (or more) in the example illustrated in FIG. 9. In the above equation (4), P is the number of positional coordinates of points on the map integration object portion, which is represented by a cloud of points, at the left side of the traveling direction, and P is five (or more) in the example illustrated in FIG. 9.

Thus, the boundary line integration function serves to add the positional coordinates of points on the sensor boundary lines in the order of proximity to the subject vehicle and then add the positional coordinates of points on the map integration object portions also in the order of proximity to the subject vehicle. Through this operation, the lane boundary lines in which the sensor boundary lines and the map boundary lines are integrated can be generated at the traveling direction side of the subject vehicle as compared with the current position of the subject vehicle. In the following description, the lane boundary lines integrated in step S110 will be referred to as "integrated boundary lines."

In step S111, the control device 160 uses the output function to output information on the integrated boundary lines generated in step S110. For example, the output function serves to output the information on the integrated boundary lines to the drive control device 150. Step S111 is followed by step S112 in which the drive control device 150 operates to control drive of the subject vehicle on the basis of the information on the integrated boundary lines output in step S111.

When the information on the integrated boundary lines is output in step S111, the control device 160 uses the output function to output the information on the integrated boundary lines in a format which the drive control device 150 utilizes. Specifically, when the drive control device 150 utilizes information on the integrated boundary lines each expressed by a function, the output function can serve to fit a function having a specific order to an integrated boundary line represented by a cloud of points thereby converting the integrated boundary line represented by a cloud of points to an integrated boundary line expressed by the function and output the information on the integrated boundary line expressed by the function to the drive control device 150. In an alternative configuration, when the information on the integrated boundary lines each represented by a cloud of points is output to the drive control device 150, the information may be output with identical intervals of the positional coordinates of points on the integrated boundary lines in a case in which the road shape is approximately a straight line, as describe above, and the information may be output with reduced intervals of the positional coordinates of points on the integrated boundary lines as the curvature of the road increases in a case in which the road shape is not a straight line. In an alternative configuration, intervals of the positional coordinates of points on the integrated boundary lines may be determined on the basis of the speed limit of the road or the speed of the subject vehicle.

As described above, in the first embodiment, the lane boundary lines around the subject vehicle based on the detection results by the ambient detection sensor 110 are detected as the sensor boundary lines, and the lane boundary lines on the planned travel route of the subject vehicle obtained from the map information are detected as the map boundary lines. Then, the map boundary lines and the sensor boundary lines are cross-checked and integrated so that the range outside the sensor boundary lines is complemented with the map boundary lines. Through this operation, even when a detection error occurs in the vehicle position detection device 120, travel of the subject vehicle can be appropriately controlled in accordance with an actual travel environment because the action plan and the planned route can be determined around the subject vehicle on the basis of the sensor boundary lines which are actually detected by the ambient detection sensor 110. On the other hand, the ambient detection sensor 110 cannot detect the lane boundary lines with a high degree of accuracy in a range separate from the subject vehicle by a certain distance (e.g. several tens of meters) or more. In the present embodiment, however, as for such a range in which the ambient detection sensor 110 cannot detect the lane boundary lines with a high degree of accuracy, the action plan and the planned route can be determined on the basis of the map information, and travel of the subject vehicle can therefore be appropriately controlled in accordance with a future travel environment.

This will be more specifically described. When travel of the subject vehicle is controlled using only the information on the map boundary lines, if a detection error occurs in the ambient detection sensor 110, travel of the subject vehicle may not be appropriately controlled because travel control of the subject vehicle is performed under a condition in which the subject vehicle is traveling in a lane different from the lane for the subject vehicle to actually travel. On the other hand, when travel of the subject vehicle is controlled using only the sensor boundary lines, travel of the subject vehicle may not be appropriately controlled in accordance with a future travel environment for the subject vehicle because it is not possible to perceive which road shape the road located ahead of the surroundings of the subject vehicle is and which position on the map the subject vehicle is traveling on. In contrast, according to the present embodiment, the sensor boundary lines and the map boundary lines are integrated and output and travel of the subject vehicle can thereby be appropriately controlled in accordance with the actual travel environment around the subject vehicle on one hand and also in accordance with a future travel environment on the other hand.

In the present embodiment, the map boundary lines and sensor boundary lines each represented by a cloud of points are integrated to generate and output the integrated boundary lines each represented by a cloud of points. Through this operation, when the boundary line information represented by clouds of points is utilized in the action determination and the travel control, the information on the integrated boundary lines each represented by a cloud of points can be used without any change. Moreover, in the present embodiment, a function having a specific order is fitted to an integrated boundary line represented by a cloud of points thereby to convert the integrated boundary line represented by a cloud of points to an integrated boundary line expressed by the function, and the integrated boundary line expressed by the function is output. This allows smooth integrated boundary lines to be output even when an error occurs in a part of the detection results by the ambient detection sensor 110.

Second Embodiment

A travel control apparatus 100 according to a second embodiment of the present invention will then be described. The travel control apparatus 100 has the same configuration as that in the first embodiment except that it operates as follows.

When integrating the sensor boundary lines and the map boundary lines, the control device 160 according to the second embodiment uses the boundary line integration function to determine a degree of reliability of the sensor boundary lines detected by the ambient detection sensor 110, on the basis of the curvature of a road and the continuity of a curve. Then, as the degree of reliability of the sensor boundary lines increases, the range of the sensor boundary lines to be integrated with the map boundary lines is expanded toward the traveling direction of the subject vehicle, while as the degree of reliability of the sensor boundary lines decreases, the range of the sensor boundary lines to be integrated with the map boundary lines is contracted toward the direction opposite to the traveling direction of the subject vehicle. Thus, the range of the sensor boundary lines to be integrated with the map boundary lines is changed on the basis of the degree of reliability of the detection results by the ambient detection sensor 110 thereby to allow the sensor boundary lines and the map boundary lines to be appropriately integrated even when the detection accuracy of the ambient detection sensor 110 is lower than a certain value. Details of a method of integrating the sensor boundary lines and the map boundary lines will be described later.

Figure 10:
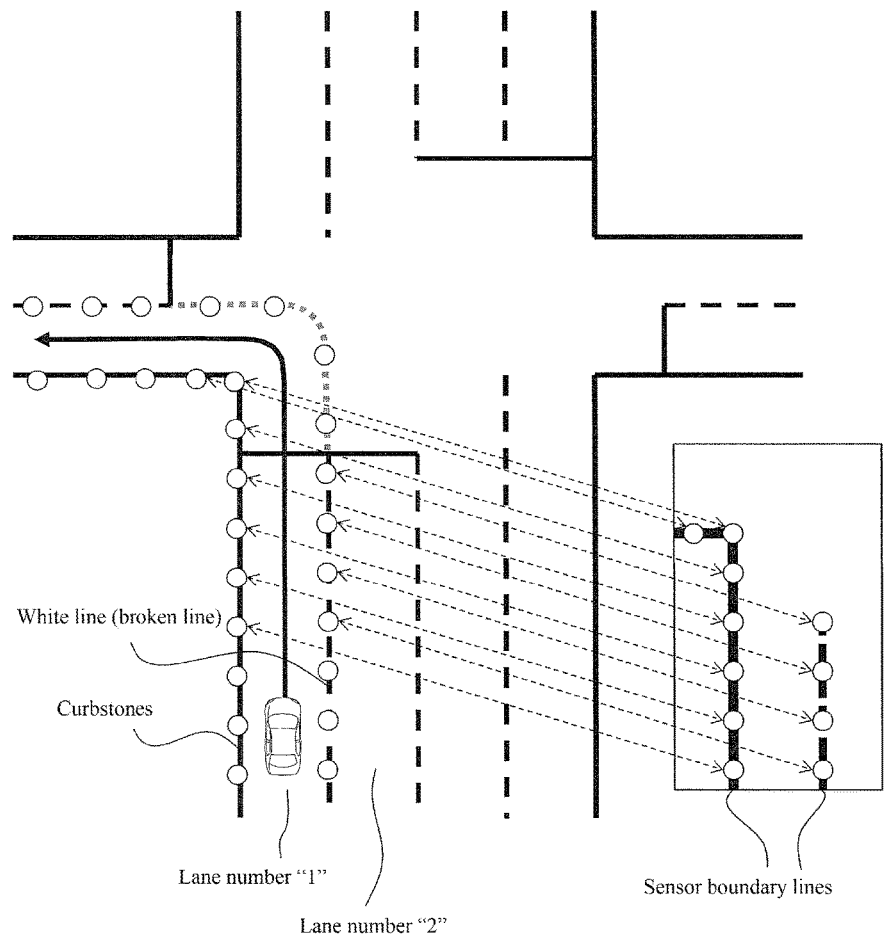
FIG. 10 is a view for describing a method of specifying the lane number of a lane in which the subject vehicle travels.

The control device 160 according to the second embodiment uses the boundary line integration function to specify the lane number of the lane in which the subject vehicle travels, on the basis of the detection results by the ambient detection sensor 110. For example, as illustrated in FIG. 10, the boundary line integration function serves to allocate lane numbers from one in the order of lanes from the road shoulder side to the center of the road. Then, the boundary line integration function serves to specify the lane number corresponding to the lane in which the subject vehicle travels, by determining whether an adjacent lane is present or absent to the lane in which the subject vehicle travels, whether the lane in which the subject vehicle travels is a lane closest to the roadside, etc. For example, as illustrated in FIG. 10, when it can be perceived from the detection results by the ambient detection sensor 110 that no adjacent lane is present at the left side of the traveling direction in the lane in which the subject vehicle travels while an adjacent lane is present at the right side of the traveling direction in the lane in which the subject vehicle travels, the boundary line integration function can serve to specify the lane number of the lane in which the subject vehicle travels as "1" that is the lane number of the lane closest to the road shoulder. FIG. 10 is a view for describing a method of specifying the lane number of the lane in which the subject vehicle travels.

In addition or alternatively, when the subject vehicle is traveling on a four-lane road, as in the example illustrated in FIG. 10, and the ambient detection sensor 110 detects curbstones or a guardrail, the boundary line integration function can serve to specify the lane number of the lane in which the subject vehicle travels as "1" that is the lane number of the lane at the road shoulder side of two lanes of the four-lane road. Although not illustrated, when the subject vehicle is traveling on a four-lane road and the ambient detection sensor 110 detects a center divider, yellow lane marks, and the like which define the boundary between the oncoming lane and the lane in which the subject vehicle travels, the boundary line integration function can serve to specify the lane number of the lane in which the subject vehicle travels as "2" that is the lane number of the lane at the center side of two lanes of the four-lane road.

Then, the boundary line integration function serves to cross-check the sensor boundary lines and the map boundary lines along the lane of the specified lane number. In the example illustrated in FIG. 10, for example, it is specified that the subject vehicle is traveling in the lane of the lane number "1" and the boundary line integration function therefore serves to cross-check the sensor boundary lines and the lane boundary lines of the lane of the lane number "1" possessed by the map information. This allows the sensor boundary lines and the map boundary lines to be appropriately integrated in accordance with the traveling situation of the subject vehicle even when at least one of the detection accuracy of the position of the subject vehicle by the subject vehicle position detection device 120, the accuracy of detection results by the ambient detection sensor 110, and the accuracy of the map information is low.

Figure 11:
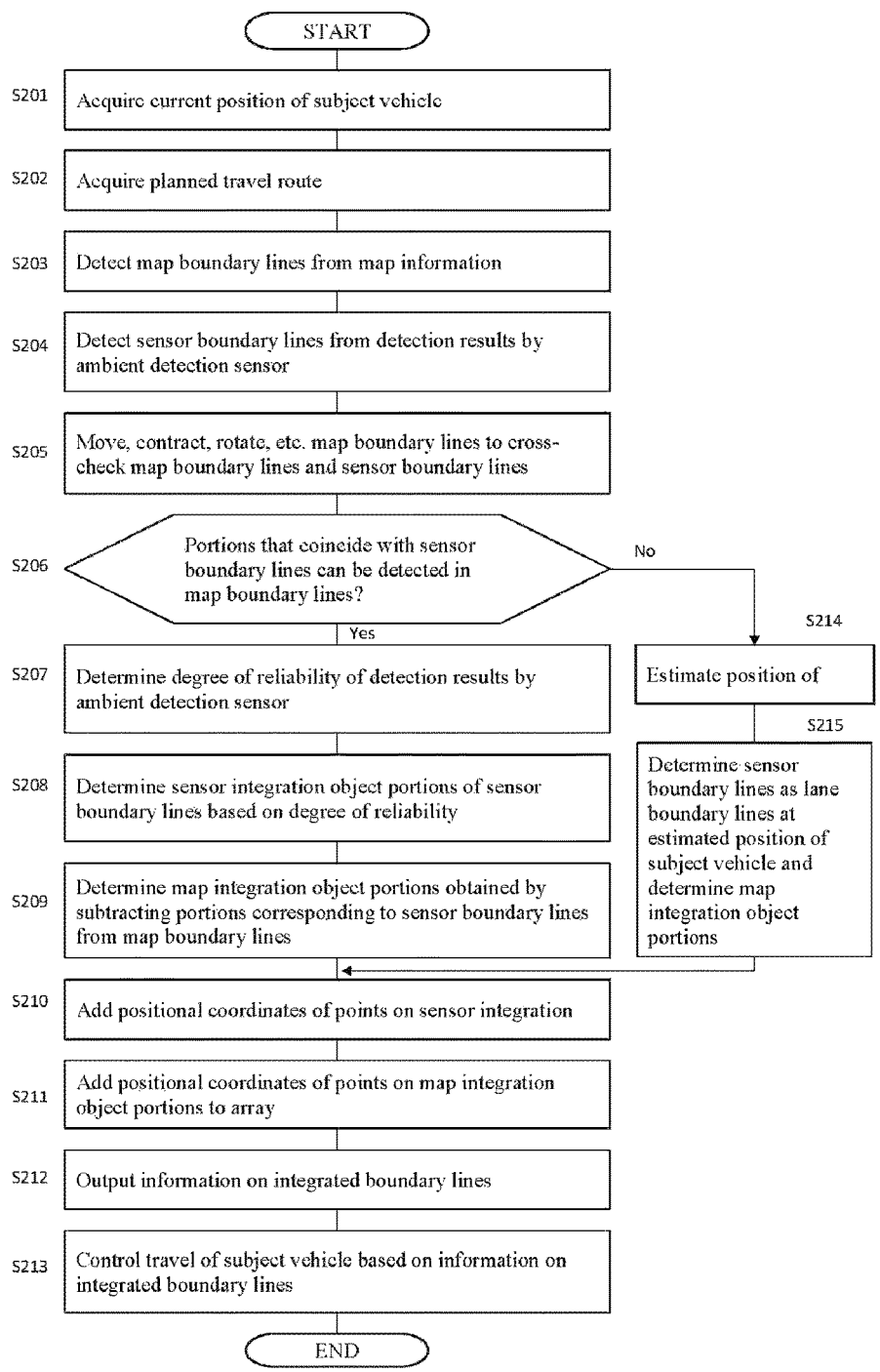
FIG. 11 is a flowchart illustrating a travel control process according to a second embodiment.

A travel control process according to the second embodiment will then be described with reference to FIG. 11. FIG. 11 is a flowchart illustrating the travel control process according to the second embodiment.

In steps S201 to S204, as in steps S101 to S104 of the first embodiment, the current position of the subject vehicle is detected (step S201), the planned travel route from the current position to the destination is searched (step S202), the map boundary lines are detected from the map information (S203), and the sensor boundary lines are detected on the basis of the detection results by the ambient detection sensor 110 (step S204).

Here, the example illustrated in FIG. 10 is a scene in which the subject vehicle is traveling on a four-lane road. The lane boundary lines to be detected are not limited to those of the lane in which the subject vehicle is traveling, and the map boundary line detection function serves to detect the lane boundary lines of lanes in which the subject vehicle can travel (in the example illustrated in FIG. 10, for example, the lane of the lane number "1" in which the subject vehicle is traveling and the adjacent lane of the lane number "2") as the map boundary lines. This will be more specifically described. In the example illustrated in FIG. 10, the subject vehicle can be estimated to turn left at the intersection in accordance with the planned travel route of the subject vehicle, and a determination can be made that the subject vehicle travels in the lane of the lane number "1" from which the subject vehicle can turn left at the intersection. In such a case, a method of detecting only the lane boundary lines of the lane of the lane number "1" as the map boundary lines is conceivable. However, another vehicle traveling at a low speed may exist ahead of the subject vehicle and the subject vehicle may possibly depart from the lane in which the subject vehicle is currently traveling, in order to overtake the other vehicle. In the second embodiment, therefore, the lane boundary lines to be detected are not limited to those of the lane in which the subject vehicle is traveling, and the lane boundary lines of lanes in which the subject vehicle can travel are detected as the map boundary lines.

In step S205, the boundary line integration function serves to cross-check the map boundary lines and the sensor boundary lines. In the second embodiment, even when the positional detection accuracy of the subject vehicle position detection device 120, the detection accuracy of the ambient detection sensor 110, or the accuracy of information on the lane boundary lines possessed by the map information is lower than a certain value, the boundary line integration function serves to move, contract, expand, or rotate the map boundary lines with respect to the sensor boundary lines to cross-check the map boundary lines and the sensor boundary lines so that they can be appropriately integrated.

Specifically, on the basis of the detection results by the ambient detection sensor 110, the boundary line integration function serves to specify the lane number of the lane in which the subject vehicle travels from a determination as to whether an adjacent lane is present or absent to the lane in which the subject vehicle travels or whether or not the lane in which the subject vehicle travels is a lane closest to the roadside or from the type of the lane boundary lines of the lane in which the subject vehicle travels. Then, the boundary line integration function serves to move, contract, expand, or rotate the map boundary lines with respect to the sensor boundary lines so as to cross-check the sensor boundary lines and the lane boundary lines, among the map boundary lines, of the lane of which the lane number is specified.

Figure 12:
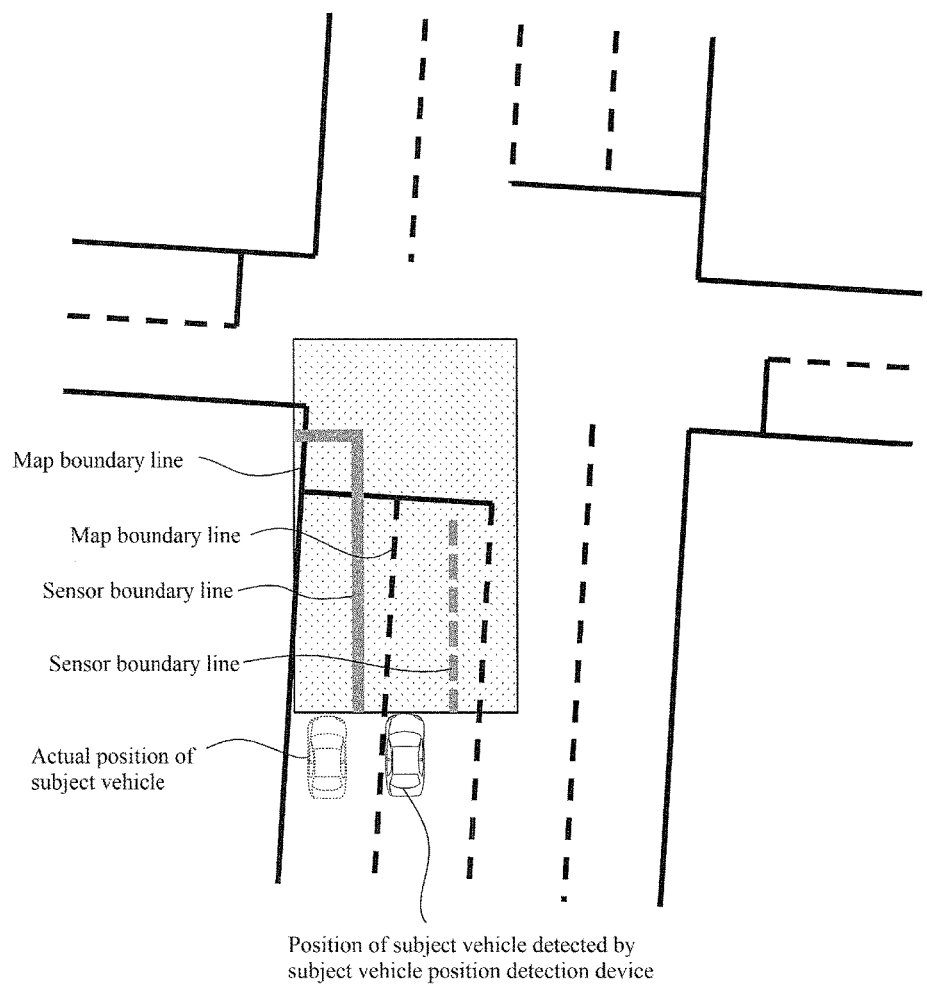
FIG. 12 is a view for describing the map boundary lines and the sensor boundary lines when the position detection accuracy of the subject vehicle position detection device, the detection accuracy of the ambient detection sensor, or the accuracy of information on the lane boundary lines possessed by map information is low.

For example, when the positional detection accuracy of the subject vehicle position detection device 120, the detection accuracy of the ambient detection sensor 110, or the accuracy of information on the lane boundary lines possessed by the map information is low, errors may occur between the map boundary lines and the sensor boundary lines, as illustrated in FIG. 12. In the case illustrated in FIG. 12, the map boundary lines can be rotated and moved so that a part of the map boundary lines coincides with the sensor boundary lines. FIG. 12 is a view for describing the map boundary lines and the sensor boundary lines when the positional detection accuracy of the subject vehicle position detection device 120, the detection accuracy of the ambient detection sensor 110, or the accuracy of information on the lane boundary lines possessed by the map information is low.

When the map boundary lines can be moved, contracted, expanded, or rotated with respect to the sensor boundary lines thereby to detect portions of the map boundary lines that coincide with the sensor boundary lines, the boundary line integration function serves to store the condition of moving, contracting, expanding, or rotating the map boundary lines in the RAM of the control device 160.

In step S206, as in step S106 of the first embodiment, a determination is made as to whether or not portions that coincide with the sensor boundary lines exist in the map boundary lines. When portions that coincide with the sensor boundary lines exist in the map boundary lines, the routine proceeds to step S207. When portions that coincide with the sensor boundary lines do not exist in the map boundary lines, the routine proceeds to step S214 or the travel control process illustrated in FIG. 11 is ended.

In step S207, the boundary line integration function serves to determine the degree of reliability of the detection results by the ambient detection sensor 110. When the curvature of a road is less than a certain value and the shape of the road is a straight line or an approximately straight line-like shape, the detection error of the ambient detection sensor 110 tends to be small as compared with the case of a curve in which the curvature of the road is not less than the certain value. When the curvature of a road is less than a predetermined value, therefore, the boundary line integration function serves to determine a higher degree of reliability of the detection results by the ambient detection sensor 110 as compared with the case in which the curvature of the road is not less than the predetermined value. In an additional or alternative configuration, the boundary line integration function can determine a lower degree of reliability of the detection results by the ambient detection sensor 110 as the curvature of the road increases. When the road is a curve and the curve includes two or more contiguous curves, the detection error of the ambient detection sensor 110 tends to be large as compared with the case in which the curve includes no contiguous curves. In an additional or alternative configuration, therefore, when the curve includes two or more contiguous curves, the boundary line integration function can determine a lower degree of reliability of the detection results by the ambient detection sensor 110 as compared with the case in which the curve includes no contiguous curves. In an additional or alternative configuration, when the curve includes contiguous curves having different curvatures, the boundary line integration function can determine a lower degree of reliability of the detection results by the ambient detection sensor 110 as compared with the case in which the curve includes contiguous curves having similar curvatures.

Figure 13:
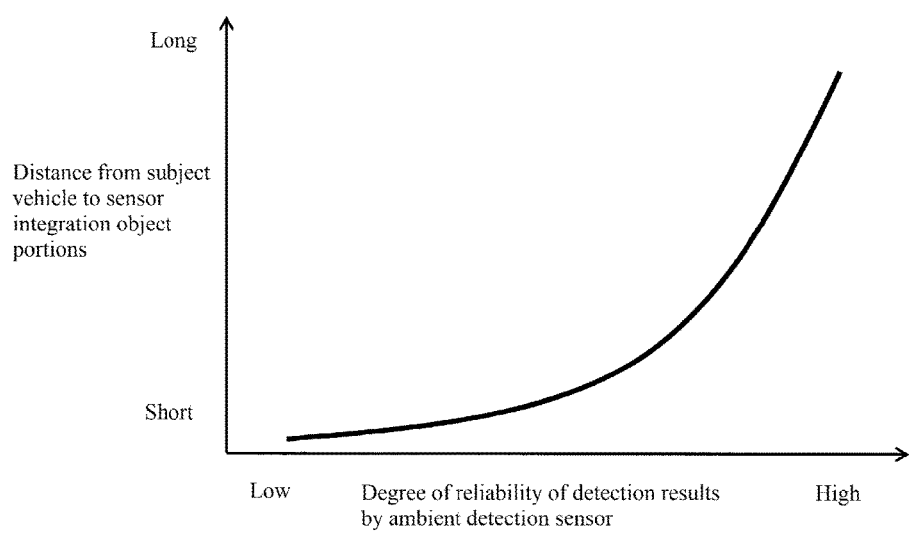
FIG. 13 is a view illustrating an example of the correspondence relationship between the degree of reliability of detection results by the ambient detection sensor and the size of sensor integration object portions.

In step S208, the boundary line integration function serves to determine the boundary line portions, among the sensor boundary lines, which are to be integrated with the map boundary lines (these boundary line portions will be referred to as "sensor integration object portions," hereinafter) on the basis of the degree of reliability of the detection results by the ambient detection sensor 110 determined in step S207. FIG. 13 is a view illustrating an example of the correspondence relationship between the degree of reliability of the detection results by the ambient detection sensor 110 and the size of the sensor integration object portions. As illustrated in FIG. 13, as the degree of reliability of the detection results by the ambient detection sensor 110 increases, the boundary line integration function serves to increase the sensor integration object portions (increase the distances from the subject vehicle to the sensor integration object portions). Conversely, as the degree of reliability of the detection results by the ambient detection sensor 110 decreases, the boundary line integration function serves to reduce the sensor integration object portions (reduce the distances from the subject vehicle to the sensor integration object portions).

Figure 14:
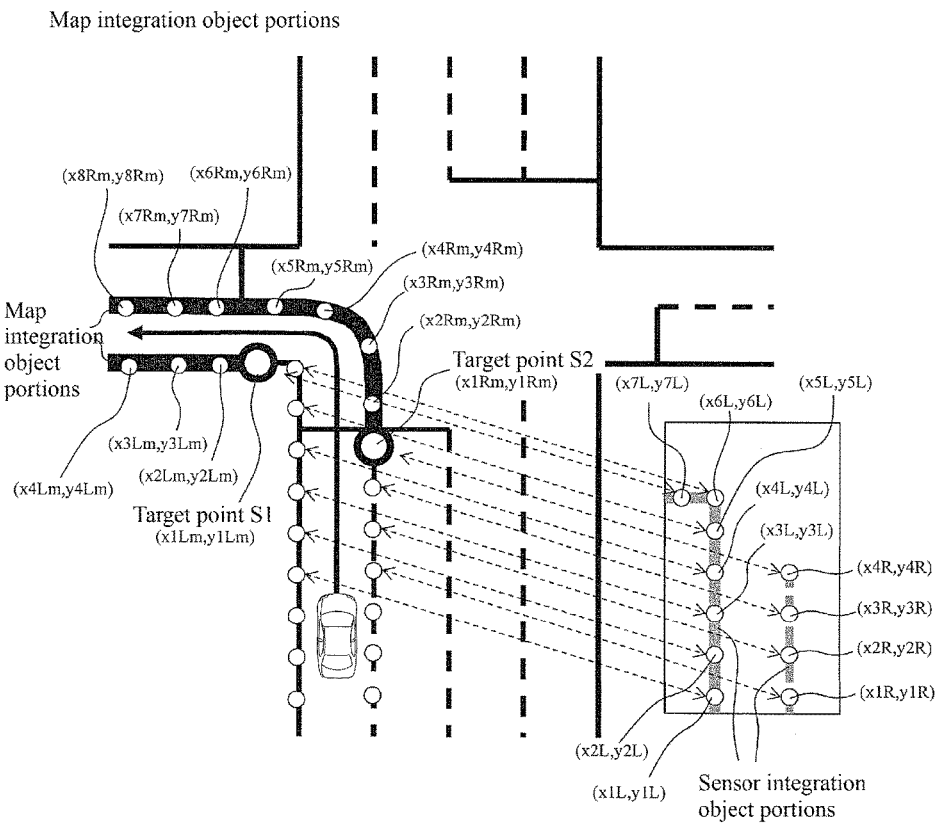
FIG. 14 is a view for describing a method of integrating the sensor integration object portions and the map integration object portions.
Figure 15:
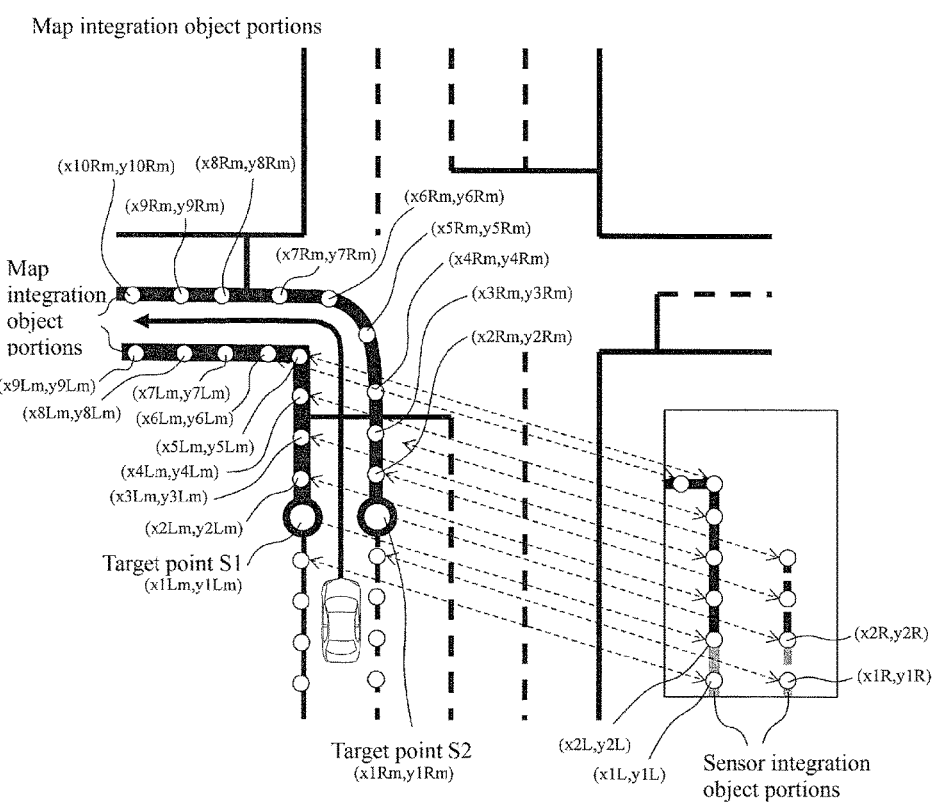
FIG. 15 is a view for describing the method of integrating the sensor integration object portions and the map integration object portions.

In the example illustrated in FIG. 14, for example, the degree of reliability of the detection results by the ambient detection sensor 110 is high and, therefore, portions within a range in the detection range for the sensor boundary lines from the position of the subject vehicle to the farthest position from the subject vehicle (e.g. portions of the sensor boundary lines indicated by gray color in FIG. 14) are determined as the sensor integration object portions. That is, in the example illustrated in FIG. 14, the entire sensor boundary lines are determined as the sensor integration object portions. On the other hand, in the example illustrated in FIG. 15, the degree of reliability of the detection results by the ambient detection sensor 110 is low and, therefore, portions of the sensor boundary lines from the position of the subject vehicle to a point relatively close to the subject vehicle (e.g. portions of the sensor boundary lines indicated by gray color in FIG. 15) are determined as the sensor integration object portions. FIG. 14 and FIG. 15 are views for describing a method of integrating the sensor integration object portions and the map integration object portions.

In step S209, the boundary line integration function serves to detect portions of the map boundary lines that are located at the traveling direction side of the subject vehicle as compared with the current position of the subject vehicle and that are obtained by subtracting portions corresponding to the sensor integration object portions detected in S208 from the map boundary lines, as the map integration object portions. For example, as illustrated in FIG. 14 and FIG. 15, the boundary line integration function serves to specify points on the map boundary lines that correspond to the farthest points on the sensor integration object portions from the subject vehicle, as target points S1 and S2. Then, the boundary line integration function can serve to detect portions of the map boundary lines that are located at the traveling direction side of the subject vehicle as compared with the target points S1 and S2 (portions in the direction of departing from the subject vehicle) as the map integration object portions.

In step S210, as described in the following equations (5) and (6), the boundary line integration function serves to perform a process of adding the positional coordinates of points on the sensor integration object portions determined in step S208 to an empty array that is preliminarily stored in the RAM of the control device 160.

$$R\_bound\ [i] = \{(x1R,y1R),(x2R,y2R), \ldots ,(xMR,yMR)\} \quad (5)$$

$$L\_bound\ [i] = \{(x1L,y1L),(x2L,y2L), \ldots ,(xNL,yNL)\} \quad (6)$$

In the above equation (5), M is the number of positional coordinates of points on the sensor integration object portion, which is represented by a cloud of points, at the right side of the traveling direction, and M is four in the example illustrated in FIG. 14 or two in the example illustrated in FIG. 15 (the same applies to the following equation (7)). In the above equation (6), N is the number of positional coordinates of points on the sensor integration object portion, which is represented by a cloud of points, at the left side of the traveling direction, and N is seven in the example illustrated in FIG. 14 or two in the example illustrated in FIG. 15 (the same applies to the following equation (8)).

In step S211, as described in the following equations (7) and (8), the boundary line integration function serves to further add the positional coordinates of points on the map integration object portions determined in step S209 to the array to which the positional coordinates of points on the sensor integration object portions are added in step S210.

$$R\_bound\ [i] = \{(x1R,y1R),(x2R,y2R), \ldots ,(xMR,yMR),\\ (x1Rm,y1Rm),(x2Rm,y2Rm), \ldots ,(xORm,yORm)\} \quad (7)$$

$$L\_bound\ [i] = \{(x1L,y1L),(x2L,y2L), \ldots ,(xNL,yNL),\\ (x1Lm,y1Lm),(x2Lm,y2Lm), \ldots ,(xPLm,yPLm)\} \quad (8)$$

In the above equation (7), O is the number of positional coordinates of points on the map integration object portion, which is represented by a cloud of points, at the right side of the traveling direction, and O is eight (or more) in the example illustrated in FIG. 14 or ten (or more) in the example illustrated in FIG. 15. In the above equation (8), P is the number of positional coordinates of points on the map integration object portion, which is represented by a cloud of points, at the left side of the traveling direction, and P is four (or more) in the example illustrated in FIG. 14 or nine (or more) in the example illustrated in FIG. 15.

Thus, in the second embodiment, the positional coordinates of points on the sensor integration object portions are added in the order of proximity to the subject vehicle and then the positional coordinates of points on the map integration object portions are added also in the order of proximity to the subject vehicle. This allows the integrated boundary lines to be generated in which the sensor integration object portions and the map integration object portions are integrated at the traveling direction side of the subject vehicle as compared with the current position of the subject vehicle.

Then, in steps S212 and S213, as in steps S111 and S112 of the first embodiment, information on the integrated boundary lines generated in step S211 is output, for example, to the drive control device 150 (step S212) and drive control for the subject vehicle is performed on the basis of the output information of the integrated boundary lines (step S213).

When, in step S206, portions that coincide with the sensor boundary lines cannot be detected in the map boundary lines, the routine proceeds to step S214. When portions that coincide with the sensor boundary lines cannot be detected in the map boundary lines as the above, it is supposed that the subject vehicle position detection device 120 cannot appropriately detect the position of the subject vehicle. In step S214, therefore, the boundary line integration function serves to estimate the position of the subject vehicle on the basis of the planned travel route of the subject vehicle and the speed of the subject vehicle.

In step S215, the boundary line integration function serves to determine that the sensor boundary lines detected in step S204 are the lane boundary lines detected at the position of the subject vehicle estimated in step S214 and, based thereon, determine the map integration object portions. That is, the boundary line integration function serves to detect portions that are located at the traveling direction side of the subject vehicle as compared with the current position of the subject vehicle and that are obtained by subtracting portions of the sensor boundary lines detected at the estimated position of the subject vehicle from the map boundary lines, as the map integration object portions.

Then, in step S210, the entire sensor boundary lines detected in step S204 are employed as the sensor integration object portions, and the positional coordinates of points on the sensor integration object portions (i.e. the entire sensor boundary lines) are added to the array. In step S211, the positional coordinates of points on the map integration object portions determined in step S215 are added to the array. Through this operation, information on the integrated boundary lines is output to the drive control device 150 in step S212 and drive control for the subject vehicle is performed in step S213.

As described above, in the second embodiment, the degree of reliability of the sensor boundary lines detected by the ambient detection sensor 110 is determined on the basis of the curvature of a road, the continuity of a curve, etc. Then, as the degree of reliability of the sensor boundary lines increases, the sensor integration object portions to be integrated with the map boundary lines are extended toward the traveling direction of the subject vehicle, while as the degree of reliability of the sensor boundary lines decreases, the sensor integration object portions are reduced toward the direction opposite to the traveling direction of the subject vehicle. Through this operation, when the detection accuracy of the ambient detection sensor 110 is not lower than a certain value, the sensor integration object portions based on the detection results by the ambient detection sensor 110 can be utilized as wide ones, and highly accurate information of the integrated boundary lines can be output in accordance with the actual traveling situation of the subject vehicle. Moreover, even when the detection accuracy of the ambient detection sensor 110 is lower than the certain value, the sensor integration object portions are limited to those around the subject vehicle, and highly accurate information of the integrated boundary lines can thereby be output.

In the second embodiment, the lane in which the subject vehicle travels is specified on the basis of the detection results by the ambient detection sensor 110, and the sensor boundary lines and the map boundary lines are cross-checked along the specified lane to integrate the sensor boundary lines and the map boundary lines. Through this operation, even when at least one of the detection accuracy of the position of the subject vehicle by the subject vehicle position detection device 120, the accuracy of detection results by the ambient detection sensor 110, and the accuracy of the map information is low (accuracy is lower than a certain value), the integrated boundary lines can be output in accordance with the traveling situation of the subject vehicle.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described one or more embodiments of the present invention, a configuration is exemplified in which the map information is acquired from the map database 130 of the travel control apparatus 100, but the present invention is not limited to this configuration and another configuration can also be employed in which, for example, the travel control apparatus 100 operates to acquire the map information from a server existing outside the travel control apparatus 100. In an additional or alternative configuration, information on the lane boundary lines of a route on which another vehicle has actually traveled may be acquired from the other vehicle (or from a server which has collected information from the other vehicle), as the information on the lane boundary lines of the map information.

In an additional or alternative configuration, when the detection accuracy of the position of the subject vehicle by the subject vehicle position detection device 120, the accuracy of detection results by the ambient detection sensor 110, and the accuracy of the map information are not lower than respective predetermined values for determination, the travel control process according to the first embodiment may be performed. In an additional or alternative configuration, when at least one of the detection accuracy of the position of the subject vehicle by the subject vehicle position detection device 120, the accuracy of detection results by the ambient detection sensor 110, and the accuracy of the map information is lower than a corresponding predetermined value for determination, the above-described travel control process according to the second embodiment may be performed. This allows the map boundary lines and the sensor boundary lines to be integrated at more accurate positions when the detection accuracy of the sensors of the travel control apparatus 100 and/or the accuracy of the map information are high, and highly accurate integrated boundary lines can therefore be output. Moreover, even when the detection accuracy of the sensors and/or the accuracy of the map information are low, the integrated boundary lines can be output with a relatively high degree of accuracy through limiting the range of the sensor boundary lines to be integrated with the map boundary lines, estimating the lane in which the subject vehicle travels, and integrating the sensor boundary lines and the map boundary lines in the estimated lane.

In the above-described second embodiment, a configuration is exemplified in which when portions that coincide with the sensor boundary lines can be checked in the map boundary lines, the sensor integration object portions are determined on the basis of the degree of reliability of detection results by the ambient detection sensor 110, and the determined sensor integration object portions and the map integration object portions are integrated, but the present invention is not limited to this configuration and another configuration can also be employed in which, for example, the sensor integration object portions are determined on the basis of the degree of reliability of detection results by the ambient detection sensor 110, and whether portions that coincide with the sensor boundary lines exist in the map boundary lines is checked.

In the above-described second embodiment, a configuration is exemplified in which the lane number of the lane in which the subject vehicle travels is specified on the basis of the detection results by the ambient detection sensor 110, and the map boundary lines and the sensor boundary lines are cross-checked along the lane of the specified lane number, but the present invention is not limited to this configuration and the following configuration can also be employed. In this configuration, the lane number of the lane in which the subject vehicle travels is specified on the basis of the detection results by the ambient detection sensor 110, and the lane number of the lane in which the subject vehicle travels is also specified on the basis of the map information and the positional information of the subject vehicle detected by the subject vehicle position detection device 120. Then, when the lane number specified based on the detection results by the ambient detection sensor 110 is identical with the lane number specified based on the positional information of the subject vehicle detected by the subject vehicle position detection device 120, the map boundary lines and the sensor boundary lines are cross-checked along the lane of that lane number.

The ambient detection sensor 110 in the above-described embodiments corresponds to the detector of the present invention.

REFERENCE SIGNS LIST

100 Travel control apparatus
110 Ambient detection sensor
120 Subject vehicle position detection device
130 Map database
140 Presentation device
150 Drive control device
160 Control device

The invention claimed is:

1. A travel control method using a detector configured to detect information on a lane boundary line of a lane around a subject vehicle as real boundary line information from an actual environment around the subject vehicle, and using a map database storing map information, the travel control method comprising:
   detecting with the detector the real boundary information;
   detecting map boundary line information as the map information on the lane boundary line of the lane around the subject vehicle;
   detecting a coincident portion between the real boundary line information and the map boundary line information;
   where the coincident portion is detected, using the real boundary information for travel control;
   where the coincident portion between the real boundary line information and the map boundary line information is not detected, complementing the real boundary line information with information other than the coincident portion in the map boundary line information and integrating the real boundary line information and complementary map boundary line information to generate integrated boundary line information, the map boundary line information being information on the lane boundary line of the lane included in map information; and
   outputting both the generated integrated boundary line information where the coincident portion is not detected and the real boundary information where the coincident portion is detected.

2. The travel control method according to claim 1, wherein the detector detects at least one of a lane mark, a curbstone, and a guardrail as the lane boundary line from the actual environment around the subject vehicle thereby to detect the real boundary line information.

3. The travel control method according to claim 1, wherein the real boundary line information and the map boundary line information are cross-checked with reference to a position of the subject vehicle thereby to detect the coincident portion.

4. The travel control method according to claim 1, wherein the real boundary line information and the map boundary line information are cross-checked along a planned travel route of the subject vehicle thereby to detect the coincident portion.

5. The travel control method according to claim 1, wherein a portion at which a degree of coincidence with the real boundary line information is highest in the map boundary line information is detected as the coincident portion.

6. The travel control method according to claim 5, wherein when a detection accuracy of a position of the subject vehicle, a detection accuracy of the detector, and an accuracy of the map information are not less than respective predetermined values for determination, the portion at which the degree of coincidence with the real boundary line information is highest in the map boundary line information is detected as the coincident portion.

7. The travel control method according to claim 1, wherein
   a degree of reliability of the real boundary line information detected by the detector is determined; and
   when the degree of reliability of the real boundary line information is not less than a predetermined value, a range of the real boundary line information before being integrated with the map boundary line information is expanded as compared with a case in which the degree of reliability of the real boundary line information is less than the predetermined value.

8. The travel control method according to claim 1, wherein
   a degree of reliability of the real boundary line information detected by the detector is determined; and
   when the degree of reliability of the real boundary line information is less than a predetermined value, a part of the real boundary line information is integrated with the map boundary line information.

9. The travel control method according to claim 7, wherein a range of the real boundary line information to be integrated with the map boundary line information is increased toward a traveling direction of the subject vehicle as the degree of reliability of the real boundary line information increases.

10. The travel control method according to claim 7, wherein a range of the real boundary line information to be integrated with the map boundary line information is reduced toward a direction opposite to a traveling direction of the subject vehicle as the degree of reliability of the real boundary line information decreases.

11. The travel control method according to claim 7, wherein the degree of reliability of the real boundary line information is determined to be lower as a curvature of a road increases.

12. The travel control method according to claim 7, wherein when a road on which the subject vehicle travels is a curve and the curve includes contiguous curves, the degree of reliability of the real boundary line information is determined to be lower as compared with a case in which the curve include no contiguous curves.

13. The travel control method according to claim 1, wherein
 a type of the lane boundary line of a lane in which the subject vehicle travels is specified on a basis of a detection result by the detector,
 the type of the lane boundary line based on the detection result by the detector and type information of the lane boundary line of the lane possessed by the map information are cross-checked thereby to specify the lane in which the subject vehicle travels, and
 the real boundary line information and the map boundary line information are integrated on an assumption that the subject vehicle travels in the specified lane.

14. The travel control method according to claim 1, wherein
 the real boundary line information and the map boundary line information are each represented by a cloud of points representing positional coordinates of points on each boundary line, and
 the real boundary line information and the map boundary line information each represented by the cloud of points are integrated thereby to output the integrated boundary line information represented by the cloud of points.

15. The travel control method according to claim 14, wherein intervals of the positional coordinates of points representing the real boundary line information and the map boundary line information each represented by the cloud of points are substantially identical.

16. The travel control method according to claim 14, wherein as a curvature of a road increases, intervals of the positional coordinates of points representing the real boundary line information and the map boundary line information are reduced, and as the curvature of the road decreases, the intervals of the positional coordinates of points representing the real boundary line information and the map boundary line information are increased.

17. The travel control method according to claim 14, wherein as a speed limit of a road or a traveling speed of the subject vehicle increases, intervals of the positional coordinates of points representing the real boundary line information and the map boundary line information are increased.

18. The travel control method according to claim 14, wherein the integrated boundary line information represented by the cloud of points is output after being converted to the integrated boundary line information expressed by a function.

19. A travel control apparatus comprising:
 a detector configured to detect information on a lane boundary line of a lane around a subject vehicle as real boundary line information from an actual environment around the subject vehicle;
 a map database storing map information; and
 a controller configured to control travel of the subject vehicle, the controller configured to:
  detect map boundary line information as the map information on the lane boundary line of the lane around the subject vehicle;
  detect a coincident portion between the real boundary line information and the map boundary line information;
  where the coincident portion is detected, using the real boundary line information for travel control;
  where the coincident portion between the real boundary line information and the map boundary line information is not detected, complementing the real boundary line information with information other than the coincident portion in the map boundary line information and integrating the real boundary line information and complementary map boundary line information to generate integrated boundary line information, the map boundary line information being information on the lane boundary line of the lane included in map information; and
  output both the generated integrated boundary line information where the coincident portion is not detected and the real boundary information where the coincident portion is detected.

20. The travel control method according to claim 1, wherein the information other than the coincident portion includes one or both of a planned travel route and a speed of the subject vehicle.

* * * * *